July 25, 1961 J. H. HUTH 2,993,945

SOLAR CELL AND METHOD OF MAKING

Filed Feb. 2, 1959

INVENTOR.
JOHN H. HUTH

BY FULWIDER, MATTINGLY & HUNTLEY

ATTORNEYS

United States Patent Office 2,993,945

Patented July 25, 1961

2,993,945

SOLAR CELL AND METHOD OF MAKING

John H. Huth, Pacific Palisades, Calif., assignor to The Rand Corporation, Santa Monica, Calif., a non-profit corporation of California Filed Feb. 2, 1959, Ser. No. 790,680
5 Claims. (Cl. 136—89)

The present invention relates to a solar cell for converting radiant energy directly into electrical energy and to a method of making the cell.

Relatively-recent developments in the field of solid-state physics, particularly as related to semi-conductor materials, have resulted in practical solar cells, i.e. solar batteries, for converting radiant energy directly into usable electrical energy. Normally, solar cells comprise a surface layer of one type semi-conductor material, for example P-type silicon, which is integrally formed with a layer of a different type semi-conductor material, e.g. N-type silicon. Exposure of the surface of the cell to radiation causes charge carriers, e.g. electrons, to be released thereby resulting in a difference in electrical potential between the two different-type layers of semi-conductor material. These layers are separated by a barrier through which the charge carriers cannot directly pass; therefore, an electrical circuit may be energized by being connected across the layers of the solar cell.

In general, solar cells have been capable of somewhat limited efficiency. One of the reasons that only limited efficiency has been attained is the power loss caused by the resistance of the surface layer through which electrical current must pass to an external circuit. Of course, any electrodes or contacts affixed on the large surface of this layer to result in a short electrical path through the layer, shields the layer from radiation and decreases the efficiency of the cell. Therefore, contacts are normally affixed to the edge of the surface layer, necessitating that current flow through the cross section of the layer which presents significant resistance.

In general, the thickness of the surface layer, e.g. P-type silicon, is maintained small in order to prevent the recombination of charge carriers. That is, in the event that a surface layer of considerable thickness is provided to decrease the resistance of the layer, minority charge carriers which are produced by the irradiation of the layer, more-readily recombine and neutralize the potential difference. As the thickness of the surface layer is maintained small, the cross sectional area is small, therefore the surface layer presents a relatively high resistance, and the electrical current in the cell is impeded with a resultant internal energy loss.

In the past, solar cells have generally been constructed by employing a surface layer having a uniform thickness that provides a compromise between the internal resistance of the layer and the probability of recombination of minority charge carriers.

In general, the present invention relates to a solar cell wherein the surface layer to be irradiated has a varying thickness, and electrical contacts are fixed to an edge of this layer so that the thickness of the layer increases as the layer approaches the electrical contact. As a result, the thickness of the surface area is somewhat proportional to the electrical current flowing therein. That is, at locations in the surface layer remote from the electrical contacts, the layer is thin, reducing the probability of recombination by charge carriers; while at locations nearer the electrode in the surface layer, the layer is relatively thick to present a reduced resistance.

An object of the present invention is to provide an improved solar cell for converting radiant energy directly into electrical energy.

Another object of the present invention is to provide a solar cell of improved efficiency.

Still another object of the present invention is to provide an improved process for manufacturing a solar cell for converting radiant energy into electrical energy.

A further object of the present invention is to provide a process for manufacturing a solar cell having a varying surface layer whereby to effect greater efficiency in the conversion of radiant energy into electrical energy.

These and other objects and advantages of the present invention will become apparent from the following detailed description, when taken in conjunction with the annexed drawings in which.

Figure 1:
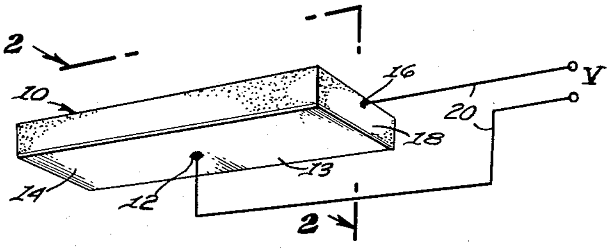
FIGURE 1 is a perspective view of one form of solar cell constructed in accordance with the present invention.

Referring now to FIGURE 1, there is shown a wafer 10 of semi-conductor material, e.g. silicon, in a crystalline structure. The upper surface of the wafer 10 is unobstructed to permit the free impingement of radiant energy thereon. One electrical contact, or electrode 12, is affixed upon the lower surface 14 of the wafer 10 and another electrical contact or electrode 16 is affixed to the end 18 of the wafer 10. The lower surface 14 is clad with a coat 13 of solder to effect full contact between the surface and the electrode 12. The electrodes 12 and 16 are connected to conductors 20 which serve to provide the voltage developed across the wafer 10 when the upper surface thereof is irradiated.

Figure 2:
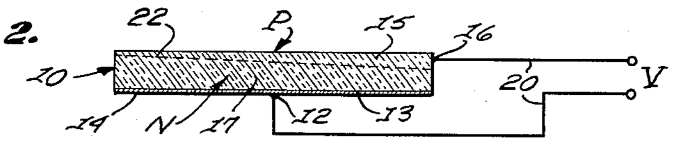
FIGURE 2 is a vertical sectional view along line 2—2 of FIGURE 1.

The wafer 10 comprises semi-conductor material of two different types, i.e. P-type and N-type. For example, upper surface layer 15 of the wafer may be formed of P-type silicon and the lower surface layer 17 may comprise N-type silicon. These two different types of semiconductors are separated by a barrier 22 as indicated in FIGURE 2. It is to be noted that the thickness of the P-type layer 15 increases as it approaches the electrical contact 16 while the thickness of the N-type layer 17 decreases upon approaching the contact 16.

In the operation of the solar cell of FIGURE 1 the upper surface of the wafer 10 is irradiated as by sunlight, causing charge carriers to be produced in the P-type upper layer 15. The charge carriers so produced are presented with the barrier 22 between the layers 15 and 17, and therefore develop a voltage potential across the barrier. The voltage potential may be used by connecting the conductors 20 to a utilization device, thereby allowing current to flow through a circuit. In such a circuit, electrical current flows through the P-type layer 15 to the electrode 16, and the amount of current flowing through the layer 15 is inversely proportional to the distance away from the electrode 16. To accommodate the increased current at locations adjacent the electrode 16, the thickness of the P-type layer 15 is increased. However, at locations away from the electrode 16, the P-type layer 15 is increasingly smaller whereby to reduce the probability of recombination by minority charge carriers. As a result, the cell operates with improved efficiency to convert radiant energy directly into electrical energy.

In the manufacture of an electrical cell as shown in FIGURES 1 and 2 and described above, the wafer 10 is formed of semi-conductor material, e.g. single-crystal silicon, which may be produced from a molten mass by crystal-growing techniques well-known in the art. In the event that a large crystal is grown from a molten mass of silicon, it will normally be cut into a number of wafers satisfactory for use as the wafer 10.

The wafer of semi-conductor material to be formed into the wafer 10 is next treated to impart different electrical characteristics to different parts of the wafer. One manner of accomplishing this change is to subject the wafer to an atmosphere containing a material which will impregnate a portion of the crystal and change it to a different type semi-conductor. For example, in the event the wafer 14 is formed of crystalline silicon, the upper surface may be exposed to an atmosphere of boron which will impregnate the crystal and change the impregnated part of the crystal to P-type silicon. The depth to which the boron or other material impregnates the wafer 10 and effects the change in the material of the wafer may be controlled by regulating the time of exposure to the boron atmosphere. Therefore, the tapered or varying depth of the P-type layer 15 may be effected by exposing the area adjacent the electrode 24 initially while the other portions of the surface are covered, and thereafter exposing greater portions of the surface to provide a P-type layer 22 of varying thickness.

After the wafer 10 has been formed as described above, the coating 13 and the electrodes 12 and 16 are affixed thereto as by various solder techniques, so as to enable the device to be connected in a circuit.

Figure 3:
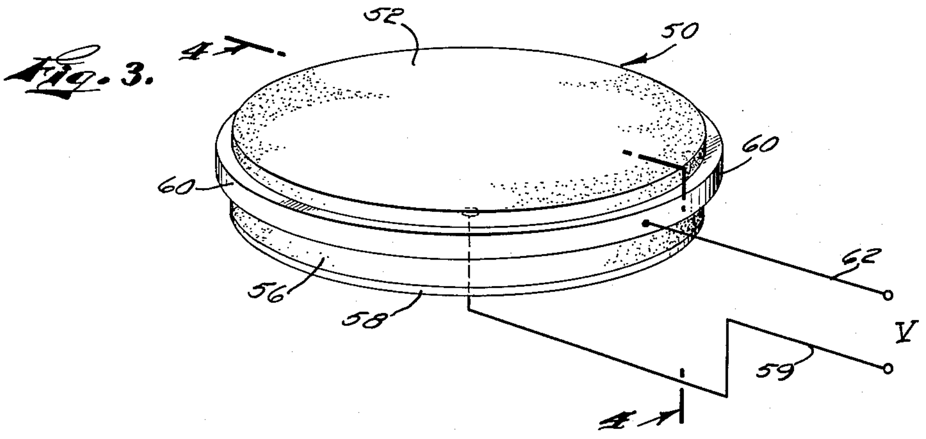
FIGURE 3 is a perspective view of another form of solar cell constructed in accordance with the present invention.
Figure 4:
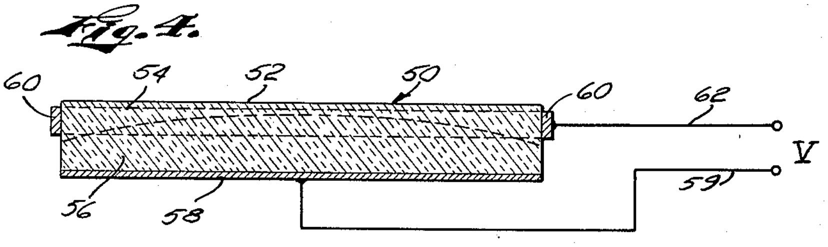
FIGURE 4 is a vertical sectional view along line 4—4 of FIGURE 3.

Reference will now be had to FIGURES 3 and 4 which show an alternative form of a solar cell constructed in accordance with the present invention. The alternative form of the cell comprises a larger wafer 50 which is formed in a disk configuration. The upper surface 52 of the wafer 50 is unobstructed to allow the surface to be fully irradiated. This surface 52 is of the upper P-type layer 54, as shown in FIGURE 4, which layer is integrally formed with a lower N-type layer 56.

The lower surface of the wafer 50 is in complete contact with a sheet 58 of conductive material, e.g. copper, which is connected to one connecting conductor 59. The periphery of the P-type layer 54 is contacted by a ring 60 of conductive material, e.g. copper, which is in turn connected to a second connecting conductor 62.

In the formation of the wafer 50, the thickness of the P-type layer 54 is made to vary so that this layer becomes increasingly thicker from the center of the wafer outward toward the ring 62. Therefore, the resistance of the P-type layer 54 decreases as the amount of current increases, which occurs at the areas that are more remote from the center of the wafer 50. Of course, the variation in the thickness of the P-type layer 54 serves to increase the efficiency of the solar cell, in the manner described with respect to the device of FIGURES 1 and 2.

In the manufacture of the solar cell as shown in FIGURES 3 and 4, a similar procedure may be employed to that described above with respect to FIGURES 1 and 2. Specifically, the wafer 50 after being formed of a semiconductor material may be exposed to an atmosphere which will alter the electrical characteristics of the crystalling material by impregnating the material. The outer periphery of the upper surface 52 of the wafer 50 may be initially exposed to such an atmosphere and thereafter the atmosphere is permitted to progressively reach the inner annular sections of the surface 52 either in discrete steps or continuously so that the time during which the atmosphere is applied to the surface 52 varies as the distance from the center of the surface 52. Of course, the resultant P-type layer 54 has a varying thickness as desired to result in a more efficient solar cell. The contact ring 60 and contact sheet 58 are affixed employing well-known techniques.

An important feature of the present invention resides in the provision of a radiation-sensitive surface in a solar cell which surface is formed of a varying thickness whereby to provide increased conductivity in locations of the surface of the layer where current concentration is highest.

From the foregoing it will be apparent to those skilled in the art that the present invention provides a greatly improved and satisfactory solar cell fully capable of achieving the objects and advantages herein set forth. It will be apparent, however, that variations may be made in the solar cell without departing from the novel features thereof. Consequently, the present invention is not to be limited to the particular arrangement herein shown and described except as defined by the appended claims.

I claim:

1. A solar cell for converting radiant energy into electrical energy comprising a semiconductor junction diode block having parallel opposite first and second outer surfaces with a barrier layer joining P and N types semiconductor material extending internally of said block at an angle to each of said outer surfaces in such manner that the depth of one type semiconductor material between said first outer surface and the barrier layer is small at one portion and becomes progressively greater toward a different portion, a first metallic contact member fixed to said different portion to make contact with said one type semiconductor material, and a second metallic contact member fixed to said second outer surface to make contact with the other type semiconductor material, said first outer surface being designed to receive said radiant energy.

2. A solar cell as defined in claim 1 in which said opposite outer surfaces of the junction diode block are rectangular, said first metallic contact member being fixed to one outer edge of said first outer surface and said barrier layer being so formed that the thickness of said one type semiconductor material is thickest adjacent said first metallic contact member and thinnest at the opposite edge.

3. A solar cell as defined in claim 2 in which said second metallic contact member covers the entire said second outer surface.

4. A solar cell as defined in claim 1 in which said junction block is cylindrical in shape and said outer surfaces are both circular, said barrier layer being so inclined to said surfaces that the depth of said one type semiconductor material is greatest at the periphery of said first-mentioned surface and becomes progressively smaller toward the center thereof.

5. A solar cell as defined in claim 4 in which said second contact member comprises a contact ring fixed to the periphery of said one type semiconductor material, and said first contact member covers the entire said second outer surface.

References Cited in the file of this patent

UNITED STATES PATENTS

| | | |
|---|---|---|
| 2,296,670 | Hewlett | Sept. 22, 1942 |
| 2,560,606 | Shive | July 17, 1951 |
| 2,644,852 | Dunlap | July 7, 1953 |
| 2,697,269 | Fuller | Dec. 21, 1954 |
| 2,703,855 | Koch et al. | Mar. 8, 1955 |
| 2,707,319 | Conrad | May 3, 1955 |
| 2,846,346 | Bradley | Aug. 5, 1958 |